(12) United States Patent
Meade

(10) Patent No.: US 7,222,726 B2
(45) Date of Patent: May 29, 2007

(54) OVEN CONVEYOR ALIGNMENT SYSTEM APPARATUS AND METHOD

(75) Inventor: Ronald Meade, La Mirada, CA (US)

(73) Assignee: Casa Herrera, Inc., Pomona, CA (US)

( * ) Notice: Subject to any disclaimer, the term of this patent is extended or adjusted under 35 U.S.C. 154(b) by 0 days.

(21) Appl. No.: 11/282,286

(22) Filed: Nov. 18, 2005

(65) Prior Publication Data

US 2006/0070530 A1    Apr. 6, 2006

Related U.S. Application Data

(62) Division of application No. 10/612,743, filed on Jul. 1, 2003.

(51) Int. Cl.
B65G 43/00 (2006.01)
(52) U.S. Cl. .............. 198/810.03; 198/807; 126/41 C; 99/443 C
(58) Field of Classification Search ............. 198/807, 198/810.03; 126/41 C; 99/443 C
See application file for complete search history.

(56) References Cited

U.S. PATENT DOCUMENTS

| 5,101,980 A | 4/1992 | Arvidson |
| 5,365,269 A | 11/1994 | Holmes et al. |
| 5,382,270 A | 1/1995 | Graham et al. |
| 5,434,617 A | 7/1995 | Bianchi |
| 5,503,265 A | 4/1996 | Hussar et al. |
| 5,868,565 A | 2/1999 | Nowack |
| 5,979,302 A | 11/1999 | Funk et al. |
| 6,062,453 A | 5/2000 | Murray et al. |
| 6,088,055 A | 7/2000 | Lareau et al. |
| 6,390,289 B1 | 5/2002 | Hoggan |
| 6,408,842 B1 * | 6/2002 | Herrera .................... 126/41 C |
| 6,493,485 B1 | 12/2002 | Korevaar |
| 6,702,103 B1 | 3/2004 | Kusel |
| 6,721,528 B1 * | 4/2004 | Schreieder et al. ......... 399/302 |
| 6,786,325 B2 * | 9/2004 | Powell ....................... 198/807 |

* cited by examiner

Primary Examiner—Mark A. Deuble
(74) Attorney, Agent, or Firm—Myers Dawes Andras & Sherman LLP; Joseph C. Andras

(57) ABSTRACT

An oven conveyor alignment system for maintaining a conveyor belt centered on its supporting rollers is disclosed. The system comprises a camera that generates an image of alignment and stores it as a digital pixel representation. Thus, the system is able to take advantage of new improvements in digital camera resolution. The image information is used by interactive software that is able to transmit an electrical signal to a tension adjustment assembly.

6 Claims, 4 Drawing Sheets

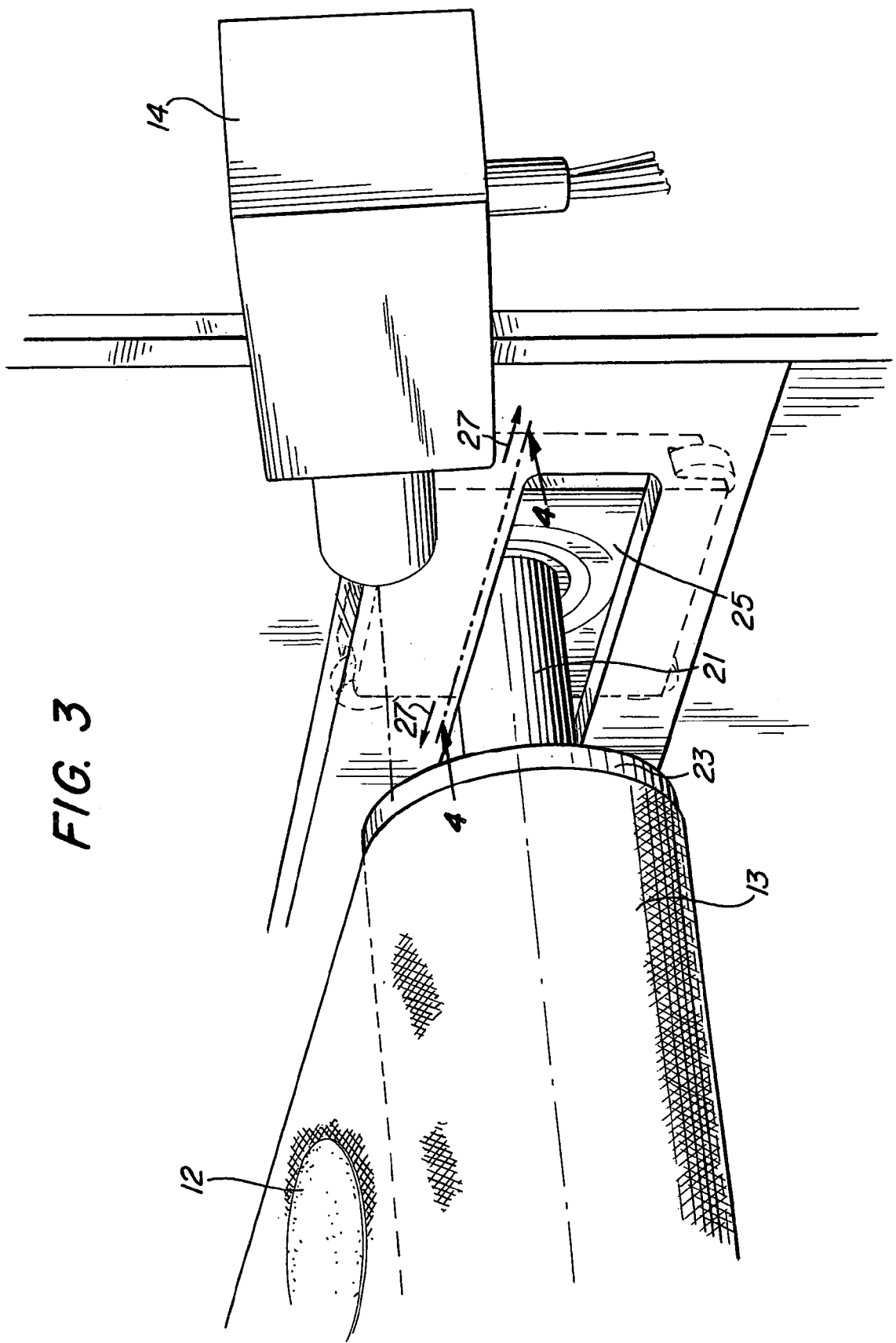

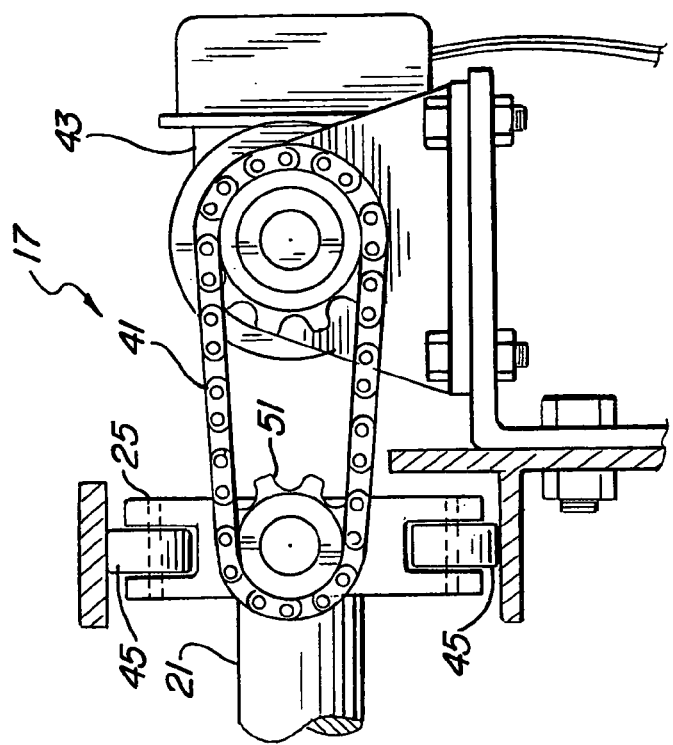
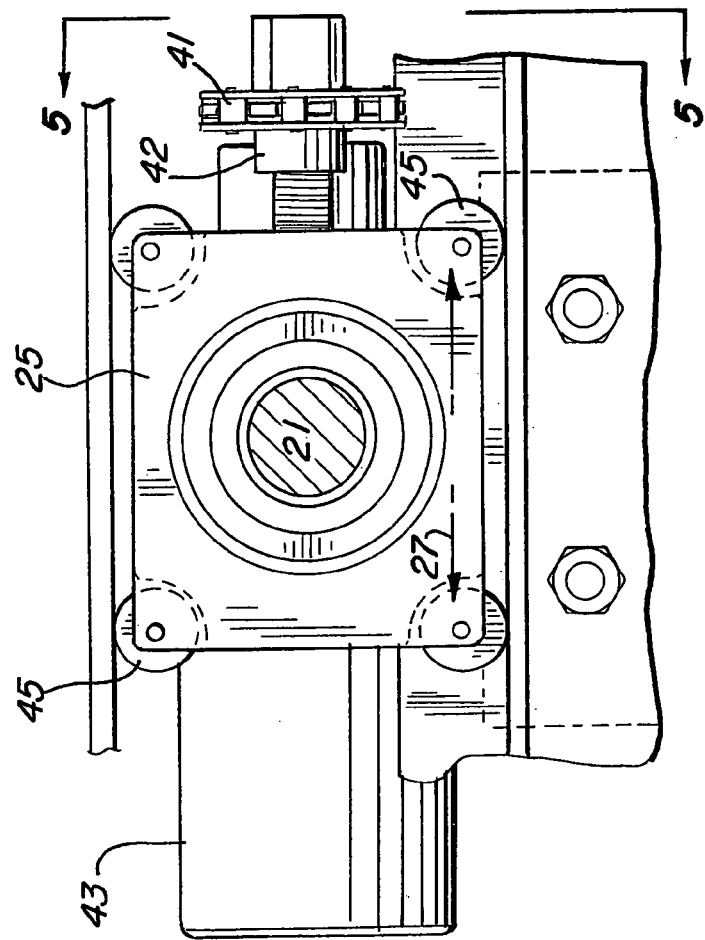
FIG. 5
FIG. 4

OVEN CONVEYOR ALIGNMENT SYSTEM APPARATUS AND METHOD

This application is a divisional of U.S. application Ser. No. 10/612,743, filed Jul. 1, 2003, now pending.

BACKGROUND OF THE INVENTION

1. Field of the Invention

This present invention pertains generally to commercial ovens. More particularly, the present invention relates to systems for maintaining alignment of conveyor belts. The present invention is particularly, but not exclusively, useful for maintaining alignment of an oven conveyer, evenly on its rollers.

2. Description of the Related Art

Large commercial ovens used for baking food items, such as tortillas, typically employ conveyors to progress items within the oven during the baking process. A conveyor is typically comprised of an endless belt mounted on a series of rollers, with one roller driving the belt while the other rollers guide the belt and maintain its alignment. The tension in the belt must be maintained because the roller, which drives the conveyor, is usually friction driven; that is, the only force operating on the belt is the friction generated by the tension of the belt on the roller. The belts are often times a wire mesh construction, which is flexible enough to withstand the temperatures and stresses generated in the oven during operation. The belts are usually wide enough for and are designed to transport multiple rows of food items and maintain the items in rows to preserve the necessary spacing often needed for baking applications.

Many factors such as uneven loading or misaligned components can cause conveyor belts to wander in a transverse direction relative to the center of a roller. Particular to oven conveyors, uneven heat distribution is problematic to alignment of the belt. That is, uneven expansion of the wire mesh belt caused by a temperature gradient will cause the belt to drift out of alignment. An oven may contain several compartments with doors and opening a particular door will cause a heat imbalance to the belt. Also, commercial ovens are typically partially exposed to the ambient environment surrounding the oven. Changing air flow within the ambient environment can cause a heat sensitive belt to become misaligned. Empirically, belts have been observed to move in a transverse direction, toward the region of higher temperature. In theory, a higher temperature will yield more elasticity in that particular side of the belt, and therefore result in decreased tension in the side of the belt. According, a means to increase tension in that case would be necessary to correct alignment.

The problems associated with continuous misalignment of an oven conveyor can be very significant. First, the belt could severely damage the inside walls of the oven. Second, replacement of prematurely worn or damaged belts is a relatively expensive procedure both in actual cost and opportunity cost. The belts themselves are expensive at a cost of approximately $2,500.00 each. The man hours required for replacement is an additional cost. Furthermore, the entire oven must be shut down and cooled down, and therefore not producing volume during down time. In practice, maintaining proper alignment of oven conveyors extends belt life from 8 months to 18 months.

Existing oven conveyor alignment systems need improvement. One such system relies on mechanical switches that are intended to trip when a conveyor belt moves out of alignment. The mechanical switches, though, cannot continuously withstand the harsh environment inside an oven. Also, mechanical alignment systems are not reliable by today's standards, since they can frequently drift out of calibration. Thus, the mechanical alignment system will not be particularly suitable for making fine adjustments in alignment. Providing fine adjustments in alignment is preferred over complete shut down of the conveyor. Shut down while hot is additionally undesirable, and if required, a shut down preceded by a cool down process is preferred.

In light of the above, it is an object of the present invention to provide a system for aligning a conveyor that can accurately sense when a conveyor belt becomes misaligned. Another object of the present invention is to provide a system for aligning a conveyor belt that is capable of making fine adjustments, as required to maintain belt alignment. Yet another object of the present invention is to provide a conveyor belt alignment system that is capable of automatic control without operator intervention. Yet another object of the present invention is to provide a system for maintaining alignment in a conveyor that is simple to use, relatively easy to implement and superior to other designs known in the art.

SUMMARY OF THE INVENTION

An oven conveyor alignment system adapted for use in an oven having an elongated axis is claimed herein. The system comprises: a terminal roller having two ends positioned transaxially with respect to the oven's elongated axis; a conveyor belt similarly having an elongated axis, the conveyor belt rotating around the terminal roller; means for aligning the conveyor belt elongated axis with the oven elongated axis by adjusting the position of the conveyor belt with respect to the two ends of the terminal roller; a camera positioned toward one of the ends of the terminal roller for generating a digital image signal corresponding to the conveyor belt's position; and means for controlling the aligning means in response to the digital image signal.

The oven conveyor alignment system of further comprises a digital medium for storing the digital image signal as a pixel representation of the conveyor belt position. Additionally, the camera has a scan interval whereby the camera generates a new pixel representation according to the scan interval. An external housing protects the camera of the invention. The aligning means of the present invention comprises a tensioning assembly connected to a roller shaft located at one of the ends of the terminal roller. The means for controlling comprises a control computer that recognizes an offset in the pixel representation of the conveyor belt position and sends a signal to the tensioning assembly in order to vary the tension on the conveyor belt at the one end of the terminal roller in order to vary the conveyor belt position and correctly align the conveyor belt's elongated axis with the oven elongated axis.

The tensioning assembly of the present invention comprises: a sprocket wheel; a motor mechanically connected to the sprocket wheel; and an adjustment nut mechanically connected to the sprocket wheel by a drive chain, wherein movement of the adjustment nut controls transaxial movement of the terminal roller, and wherein transaxial movement of the terminal roller controls the alignment of the conveyor. The control computer of the present invention has instructions corresponding to an alarm trip point for an alarm magnitude of pixel misalignment; and a shut down trip point corresponding to a shut down magnitude of pixel misalignment. The means for aligning can alternatively be controlled either manually or automatically.

The invention can also be described as a method of maintaining oven conveyor alignment with respect to a terminal roller having two ends, the conveyor belt rotating around the terminal roller, the method comprising: positioning and focusing a camera to view the oven conveyor belt alignment with respect to one of the ends of the terminal roller; generating a digital image signal of the oven conveyor belt with respect to the end of the terminal roller; and using the digital image signal to make necessary adjustments on the oven conveyor alignment.

The method further comprises storing the digital image signal as a pixel representation of oven conveyor alignment with respect to the end of the terminal roller. Additionally, the method further comprises repeating the generating a digital image signal of the oven conveyor according to a selected scan interval. Finally, the method comprises using the digital image signal to make necessary adjustments on the conveyor alignment.

The step of using the digital image signal to make necessary adjustments comprises: comparing the stored pixel representation of conveyor alignment to a coordinate system representing zero error in conveyor alignment to generate an electrical signal based on misalignment; sending the electrical signal to a motor able to adjust tension on one of the ends of the terminal roller; and adjusting the tension on one of the ends of the terminal roller to correct the misalignment. The method of the invention also comprises projecting the digital image signal on a video monitor for use by an operator.

BRIEF DESCRIPTION OF THE DRAWINGS

The just summarized invention can be best understood with reference to the following description taken in view of the drawings of which:

FIG. 3 is a perspective illustration of the present invention showing a camera monitoring alignment of an oven conveyor belt;

FIG. 4 is a sectional view, taken along line 4—4 in FIG. 1, showing a tension roller assembly of the present invention;

FIG. 5 is a side view, as seen from line 5—5 in FIG. 4, showing a tensioning assembly of the present invention.

DETAILED DESCRIPTION OF SPECIFIC EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to commercial ovens.

Figure 1:
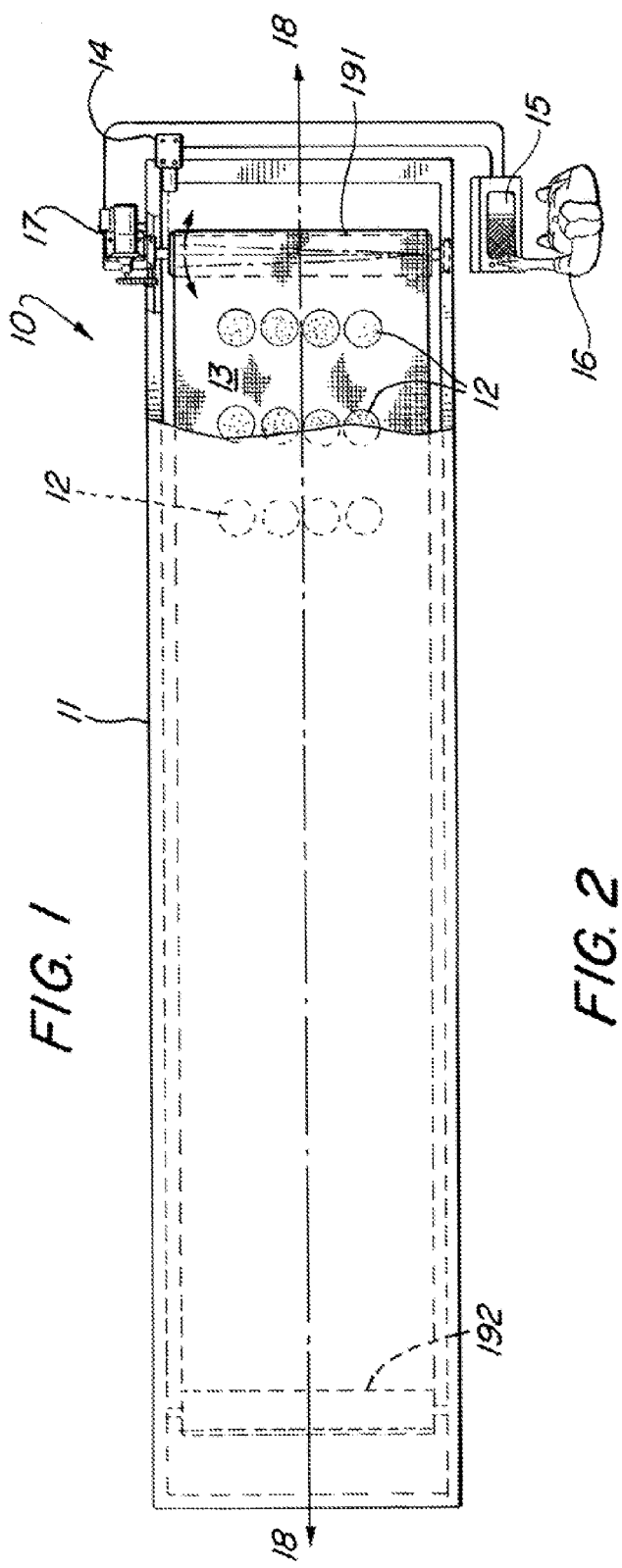
FIG. 1 is a top plan view of an embodiment of the present invention.

An oven conveyor alignment system for maintaining a conveyor belt centered on its supporting rollers is disclosed. A top view of the system 10 of the present invention is shown in FIG. 1. Oven 11 is generally an elongated rectangular shape and is symmetrical about axis 18. Conveyor belt 13 rotates in the oven about terminal rollers 191 and 192 (shown as dashed lines). Conveyor 13 communicates food items 12, such as tortillas, through the oven 11 along axis 18.

Figure 2:
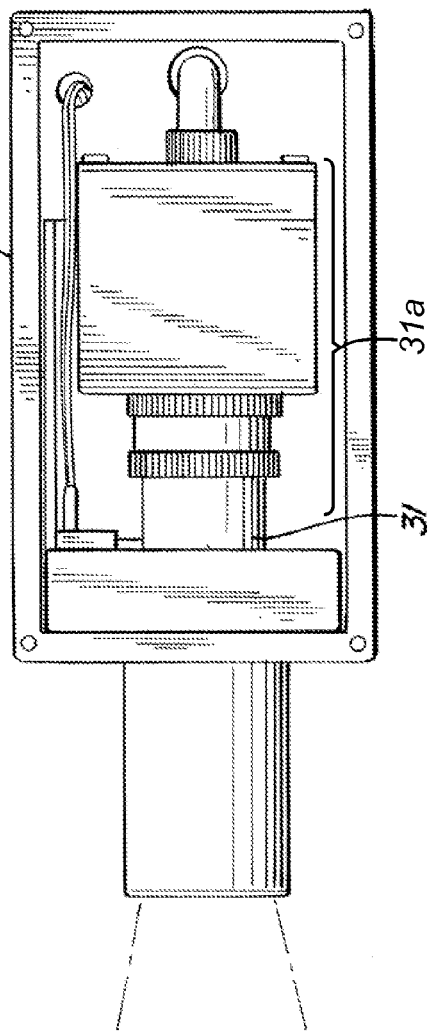
FIG. 2 is a top view of a camera of the present invention surrounded by a secondary camera housing.

The purpose of the alignment system 10 of the invention is to keep conveyor 13 centered with respect to axis 18. In doing so, the conveyor 13 is maintained centered on terminal rollers 191, and 192. The relative alignment of the conveyor belt 13 can be observed by referencing to one of the ends 23 of a terminal roller (FIG. 2). When the conveyor 13 becomes misaligned, it will move in position with respect to the end 23 of the terminal roller 191. Tensioning assembly 17 is provided to make adjustments in conveyor belt 13 alignment and repositions the conveyor 13 with respect to the end 23 of the terminal roller.

Now referring to FIGS. 1 and 2, a camera 31 having a primary camera housing 31a, and protected by secondary camera housing 14, is positioned and focused according to the present invention, to view the conveyor 13 alignment with respect to one of the ends 13 of the terminal roller 191. The camera 31, is alternatively manual or automatic focus. Additionally, camera 31 is able to create a digital image of the oven conveyor belt 13 with respect to the end 23 of the terminal roller 191. Next, the digital image is stored as a pixel representation of conveyor 13 alignment. The digital image is then compared to an original digital image that represents zero-error in conveyor 13 alignment. The comparison of the images can be done manually, using video monitor 15, or automatically with the aid of a computer. Further, a coordinate system can be employed that is superimposed on the digital image of conveyor 13 alignment. Therefore, a particular number of pixels can be easily converted to a magnitude of pixel misalignment represented in inches or centimeters, for example.

In the invention embodiment where an operator is required to manually make alignment adjustments, the operator is able to precisely observe the magnitude of misalignment and then manipulate the tension adjustment assembly 17 accordingly. Alternatively, a control computer having a set of instructions is employed and the camera has a scan interval so the system 10 can track movement of the conveyor belt 13. In this methodology, images are sequentially generated by the camera 13 and then stored as pixel representations during each of the scan intervals of the system 10. A sequence of pixel differences between pairs of images is then evaluated to produce pixel information indicative of movement of the objects. Stated differently, each pixel cell will have an electrical charge stored in a potential well representing the scene information. As a certain electrical charge is transferred row by row within the pixel array it is converted to a magnitude of pixel misalignment. The computer will have programmed instructions to send an electrical signal to the tensioning assembly 17 to correct misalignment when a design threshold is reached. In either embodiments describing manual or automatic adjustment, the system 10 has an alarm trip point and an automatic shut down trip point for misalignment.

Referring to FIG. 3, conveyor belt 13 is aligned with respect to one end 23 of the terminal roller. Transaxial movement 27 of the terminal roller shaft 21 will control the conveyor belt 13 position while the opposite end of the terminal roller (not shown in FIG. 3) remains fixed. The tension roller assembly 25 that provides the transaxial movement 27 is illustrated more clearly in FIG. 4. An adjustment nut 42, is used to move the roller assembly 25 about its rollers 45.

As shown more clearly in FIG. 5, the tension adjustment assembly 17 provides a means to adjust the tension of the belt 13 on one of the end of the terminal roller 23. Importantly, adjusting the tension in one side of the terminal roller while the opposing side remains fixed will cause an alteration in alignment of the conveyor belt 13. Other tension adjustment means known in the art may equally be employed by the present invention. The tension adjustment nut 42 is coupled to a sprocket wheel 51. Sprocket wheel 51 is driven by drive chain 41, connected to motor 43 that is capable of delivering a high torque necessary for high load industrial machinery.

Figure 6:
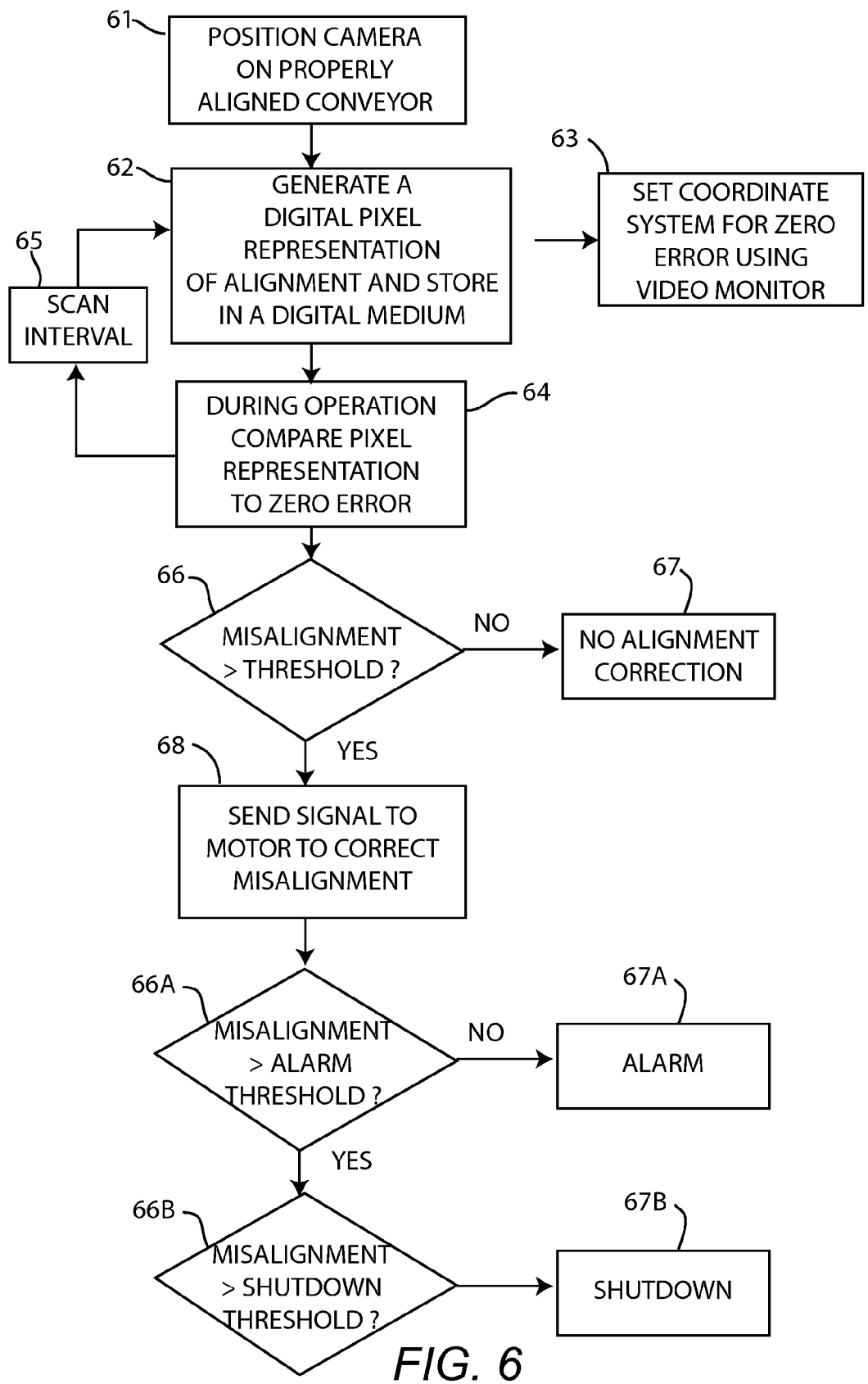
FIG. 6 is a simplified block diagram of a method embodied by the present invention is shown.

Referring to FIG. 6, a simplified block diagram of a method embodied by the present invention is shown. Initially, before operation, a camera is positioned to view a properly aligned conveyor, 61. Next, a digital pixel representation of conveyor alignment is generated 62, as described herein. A coordinate system is then set for zero alignment, 63. The coordinate system, in one embodiment, is superimposed on a video monitor shoeing the image of the conveyor. Each increment on the coordinate system, left or right of zero error, represents a certain number of pixels according to the width of a pixel. During operation, the actual pixel representation of alignment is compared to the zero error 64, using a computer or manually on the video monitor 15. Steps 62 and 64 are repeated according to scan interval 65. When a threshold of misalignment is reached 66, according to a certain number of pixels of misalignment, a signal is sent to the motor 43 to correct the misalignment 68. If the misalignment is less than the threshold, then no alignment correction is needed 67. Also, as shown by items 66A, 67A, 66B, and 66B, alarm and shut down trip points, according to selectable magnitudes of misalignments can be incorporated into the method.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. A method of maintaining oven conveyor alignment with respect to a terminal roller having two ends, wherein an oven conveyor belt has an elongated axis and the conveyor belt is rotating around the terminal roller, the method comprising:

providing an oven with an interior and a conveyor belt moving through the interior;

heating the interior of the oven to a temperature that is sufficient to cook food items moving on the conveyor belt within the oven;

cooking food items in the oven by moving the food items through the oven on the conveyor belt;

providing a camera having a primary camera housing;

providing a secondary camera housing;

protecting the camera by enclosing the camera and its primary camera housing within the secondary camera housing;

positioning and focusing the protected camera to view the oven conveyor belt alignment with respect to one of the ends of the terminal roller;

generating a digital image signal of the oven conveyor belt with respect to the end of the terminal roller; and using the digital image signal to make necessary adjustments to the oven conveyor alignment.

2. The method of claim 1, further comprising storing the digital image signal as a pixel representation of oven conveyor alignment with respect to the end of the terminal roller.

3. The method of claim 1, further comprising repeatedly the generating a digital image signal of the oven conveyor according to a selected scan interval.

4. The method of claim 2, wherein using the digital image signal to make necessary adjustments on the conveyor alignment comprises:

comparing the stored pixel representation of conveyor alignment to a coordinate system representing zero error in conveyor alignment to generate an electrical signal based on misalignment;

sending the electrical signal to a motor able to adjust tension on one of the ends of the terminal roller; and adjusting the tension on one of the ends of the terminal roller to correct the misalignment.

5. The method of claim 1, further comprising projecting the digital image signal on a video monitor for use by an operator.

6. The method of claim 1 wherein the step of positioning and focusing the protected camera is implemented by positioning the protected camera outside of the heated interior of the oven and within an area of the oven that is partially exposed to an ambient environment surrounding the oven.

* * * * *